United States Patent [19]
Gordon, Jr. et al.

[11] 3,742,925
[45] July 3, 1973

[54] TIMING MECHANISM FOR ENGINES

[75] Inventors: Phillip B. Gordon, Jr., Washington; Gerald Edward Whitehurst, East Peoria, both of Ill.

[73] Assignee: Caterpillar Tractor Co., Peoria, Ill.

[22] Filed: July 19, 1971

[21] Appl. No.: 163,648

[52] U.S. Cl. 123/139 AQ, 123/140 MP, 123/139 AP
[51] Int. Cl. ........................................... F02m 39/00
[58] Field of Search............. 123/140 MC, 140 MP, 123/140 R, 139 AP, 139 AQ, 139 AE, 140, 139; 64/25

[56] References Cited
UNITED STATES PATENTS

| | | | |
|---|---|---|---|
| 3,401,679 | 9/1968 | Ashley et al.................. | 123/139 AE |
| 3,077,873 | 2/1963 | Parks et al................... | 123/140 MC |
| 3,603,112 | 9/1971 | Sola............................. | 123/139 AP |
| 3,313,283 | 4/1967 | Miller........................... | 123/140 R |
| 3,258,937 | 7/1966 | Kranc et al.................. | 64/25 |

Primary Examiner—Geo. V. Larkin
Assistant Examiner—Cort Flint
Attorney—Charles M. Fryer et al.

[57] ABSTRACT

Two embodiments of a device for automatically timing joined to fuel injection in a turbocharged internal combustion engine, one the injection timing being varied by a mechanism responsive to engine speed and also by a pressure-actuated mechanism responsive to engine load. The speed sensing mechanism acts separately or in combination with the load sensing mechanism to achieve optimum timing in accordance with the engine requirements.

5 Claims, 2 Drawing Figures

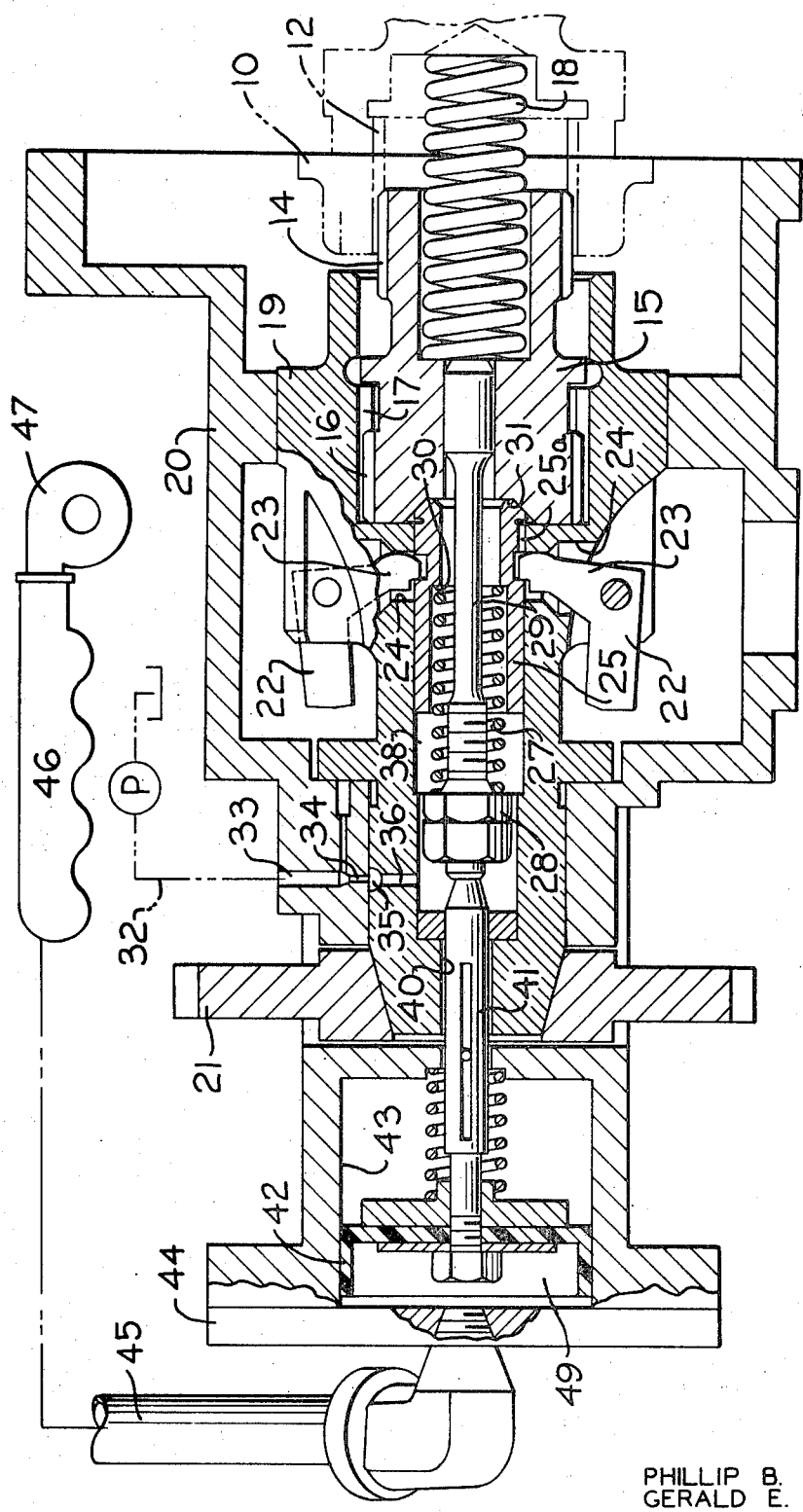
INVENTORS
PHILLIP B. GORDON, JR.
GERALD E. WHITEHURST

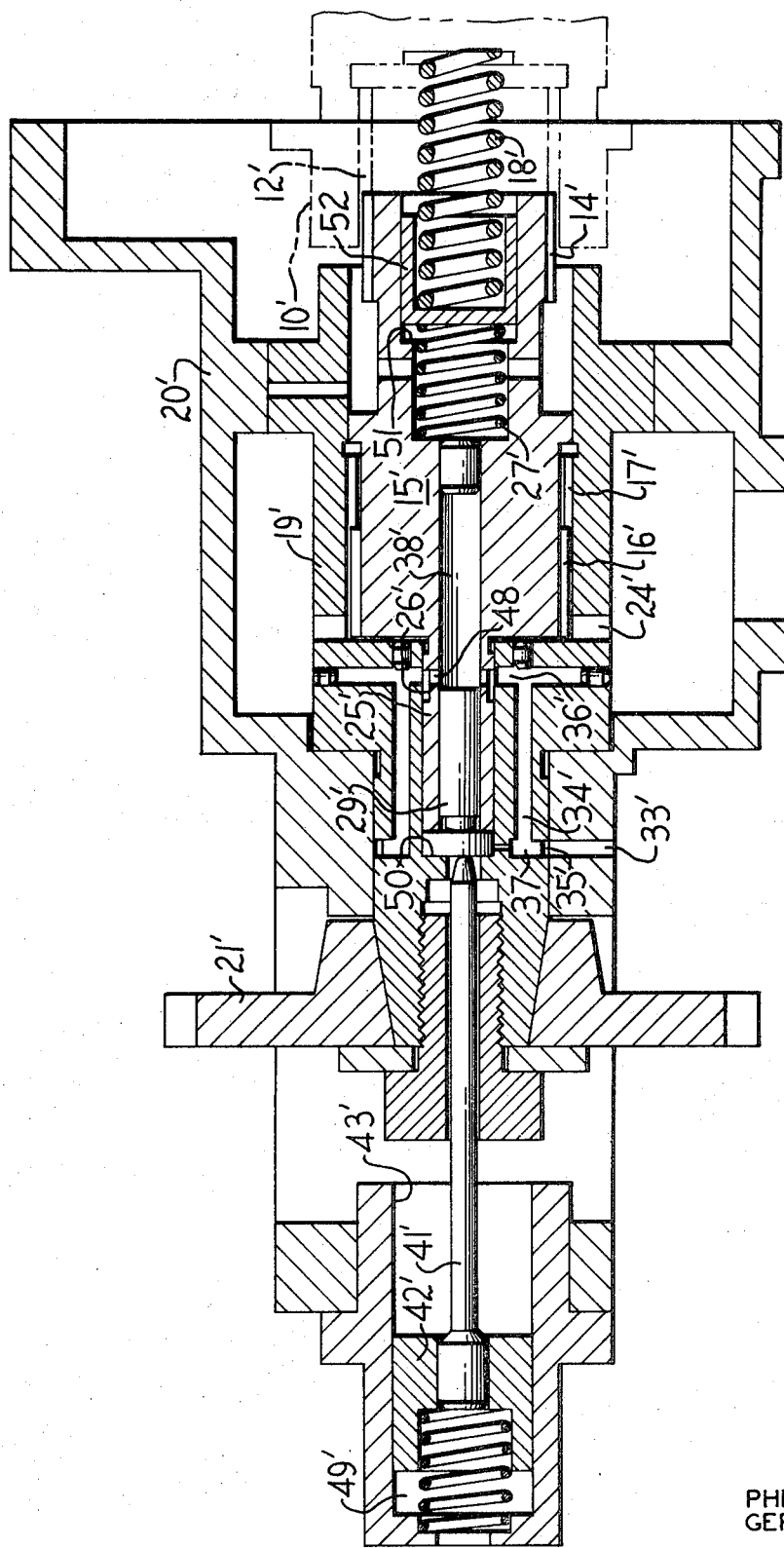

TIMING MECHANISM FOR ENGINES

REFERENCE TO RELATED U.S. PATENTS

Typical prior art devices, as discussed below, are set forth in U.S. Pat. No. 3,258,937, issued to Kranc et al., on July 5, 1966 and U.S. Pat. No. 3,401,679, issued to McDowell et al., on Sept. 17, 1968, both of which are assigned to the assignee of the present invention.

BACKGROUND OF THE INVENTION

Automatic timing devices are often used to vary timing of fuel injection in engines to obtain greater efficiency throughout an operating speed range and to provide good starting characteristics. Certain timing devices, such as that set forth in U.S. Pat. No. 3,258,937, rely on speed sensing to obtain a change in timing. It has been found that speed sensing devices are not always satisfactory for engines subject to a varying load. For instance, when operating at a steady speed with a given load, such a timing mechanism adjusts the injection of fuel for that particular speed condition. If the load on the engine is increased, while its speed remains constant, fuel injection timing should be further advanced. However, a speed sensing device retains the particular timing position dictated by the speed with the result that engine timing is retarded with respect to the engine load. On other mechanisms, such as that set forth in U.S. Pat. No. 3,401,679, the timing advance is achieved by means sensitive to pressure from an intake manifold which is charged by a turbocharger. Although inlet manifold pressure is responsive to engine speed and load, under certain conditions such as low speed or load ranges, the turbocharger does not have sufficient energy to properly operate the timing device while varying speed or load conditions call for a timing advance.

BRIEF SUMMARY OF INVENTION

The present invention improves fuel injection timing by providing a device which causes timing changes to occur relative to engine speed and load throughout the operating range, thereby increasing engine performance, decreasing fuel consumption and eliminating or reducing smoke emission. The timing device of the present invention is controlled by means responsive to engine speed as well as by additional means responsive to engine speed and/or load.

It is an object of the present invention, therefore, to provide means for insuring proper fuel injection timing in accordance with engine speed and to further vary the timing in accordance with engine load as well as speed.

BRIEF DESCRIPTION OF THE DRAWINGS

FIG. 1 is a sectioned view of an engine timing device embodying the present invention; and FIG. 2 is a sectioned view showing a modification of the timing mechanism.

DESCRIPTION OF THE PREFERRED EMBODIMENTS

Referring to FIG. 1, a fuel pump camshaft 10 has splines 12 slidably engaging splines 14 of a coupling member 15 urged in a leftward direction by a spring 18. At its oposite end, coupling member 15 has helical splines 16 slidably engaging splines 17 of a hollow shaft 19. Axial movement of the coupling causes rotational movement of the coupling member 15 and cam shaft 10 relative to the shaft which is rotatably mounted in a housing 20 and driven by a timing gear 21. Rotation of the cam with relation to a fuel pump (not shown) with which it is associated conventionally advances or retards fuel injection timing.

Flyweights 22 are pivotally secured to shaft 19 and have arms 23 extending through apertures 24 of the shaft for engaging an annular groove in a valve member 25. A spring 27 is disposed between a retainer 28 on a rod 29 which is slidably supported in the coupling 15 and a shoulder 30 of the valve member 25. The spring 27 urges the valve in a rightward direction against a face 31 of the coupling member 15. A passage 33 formed in the housing 20 is connected to a source of fluid under variable pressure. As shown in FIG. 1, the source is a pressurized lubricant passage 32 in the engine. Fluid pressure communicated to passage 33 is thus generally proportional to engine speed at least for a lower speed range of the engine. Fluid from passage 33 is communicated through an orifice 34 to an annular groove 35 in the shaft 19. The annular groove 35 is intersected by a passage 36 which communicates with a chamber 38. Variable fluid pressure in the chamber 38 acts on the coupling member 15 in a manner discussed below to assist in positioning of the coupling member 15 and cam shaft 10 for time adjustment.

Additional means for adjusting timing by selective positioning of the coupling member and cam shaft 10 include a rod 41 extending through an aperture 40 in the shaft 19. The rod 41 is secured to a piston 42 slidably arranged within a bore 43 of housing 20. A cove 44 is secured to the housing to close the bore or cylinder 43. A conduit 45 communicates an inlet manifold 46 through which pressurized air is delivered to the engine (not shown) by a turbocharger 47, and a chamber 49 formed between the piston 42 and cover 44.

In operation of the embodiment of FIG. 1, gear 21 is driven by the engine drive train and imparts rotational movement to shaft 19. Rotation of shaft 19 causes flyweights 22 to be moved outwardly by centrifugal force and arms 23 urge valve 25 in a leftward direction against the force of spring 27. At low speeds, fluid pressure developed in the engine passage or chamber 32 and communicated to chamber 38 tends to escape between face 31 of coupling 15 and valve 25 since the valve 25 is shifted slightly to the left against the spring 27 by the flyweights. The fluid then passes through an axial groove 25a of the valve and out of apertures 24 in the shaft 19. As engine speed increases further, for example to low idle speed, valve 25 is urged further to the left by flyweights 22 blocking passage 25a. Fluid pressure in the chamber 38 then acts against coupling 15 urging it in a rightward direction against the preload force of spring 18 generally in proportion to engine speed and fluid pressure in the passage 32. Axial movement of coupling 15 to the right causes the helical splines 16-17 to rotate the coupling, thus changing the angular relation of cam shaft 10 and causing an advance in fuel injection timing. Thus, the flyweights and valve 25 together initially retarded timing as is commonly desired during starting, for example. After the engine is started and exceeds a low idle speed, fluid pressure in the chamber 38 adjusts timing relative to engine speed. Such speed dependent regulation, which might also be accomplished by mechanical means, such as another set of flyweights similar to those indicated at 23, is suitable for relatively low speed operation of the engine.

However, at relatively high engine speeds in particular, it is desirable to adjust timing relative to both speed and load. In the present device, air pressure in the manifold 46 increases generally in proportion to speed and/or load and at relatively higher engine speeds, acts in chamber 49 to move piston 42 and rod 41 rightwardly until the rod 41 engages the end of rod 29. Further rightward movement of the piston and rod 41 acts through rod 29 to shift the coupling member 15 to a more advanced timing position.

At a constant speed with air pressure from the manifold controlling the coupling member position, engine load may increase such as when a vehicle ascends a hill. When this occurs, the engine governor causes more fuel to be injected into the engine cylinders to compensate for the increased load to maintain constant engine speed. Also, inlet manifold pressure is increased by turbocharger 47 so that the piston 42 acts on the coupling member to further increase timing with respect to load. When the vehicle descends the hill, engine load decreases and speed increases. The flyweights 22 then move outwardly, urging valve 25 to the left so that fluid pressure in the chamber 38 again acts on coupling 15 while inlet manifold pressure is slightly reduced. This allows spring 18 to move coupling 15 toward a retarded timing position but only to the extent where the combined force of fluid pressure in the chamber 38 and the force of air pressure acting on piston 42 balance the force of spring 18 acting on coupling 15. Thus, the combination of inlet manifold pressure, proportional to engine speed and load, and fluid pressure controlled by engine speed provides improved timing adjustment for a broad operating range of the engine.

A modified form of invention, as illustrated in FIG. 2, employs fluid pressurized in proportion to engine speed and spring means to achieve timing adjustment at relatively low speeds in place of the combination of fluid pressure and the flyweights 22 illustrated in FIG. 1. Portions of the timing device of FIG. 2 generally correspond with portions of the device in FIG. 1 and are accordingly labelled with similar primed numerals. Engine lubricant under varying pressure, enters a passage 33' in the housing 20' which communicates with an annular groove 35' and passages 37, 34' and 36' formed in the shaft 19'. Passage 36' intersects an annular groove 26' of a valve 25' which is part of a coupling member 15'. An intersecting passage 48 communicates between annular groove 26' and a chamber 38'.

Helical splines 16' on the coupling member 15' slidably engage splines 17' of the shaft 19'. Straight splines 14' on the coupling member 15' sligably engage splines 12' of cam shaft 10'. Springs 27' and 18' urge the coupling member 15' in a leftward direction. A rod 41' is secured to a piston 42' which is slidably arranged in a bore 43'. The rod 41 engages a rod 29' abutting valve 25'. Manifold pressure is communicated to a chamber 49' on the left side of the piston 42' in the same manner as described above with reference to FIG. 1.

In operation of the device of FIG. 2, gear 21' transmits driving force to cam shaft 10' by means of shaft 19' and coupling 15'. Engine oil, under pressure, is delivered through passages 33'-37-34'-36' into a groove 26 and then through a passage 48 to a chamber 38' where it tends to urge the coupling member 15' to the right. However, the preload force of spring 27' is sized to prevent movement of the coupling until pressure commensurate with low idle speed is reached. As engine speed increases, fluid pressure in chamber 38' also increases, shifting coupling member 15' further toward the right.

Piston 29' is restrained, by fluid in the chamber 38', against a shoulder 50 of shaft 19' at least for relatively low engine speeds. As coupling 15' moves rightwardly, the rate of timing advance is determined by pressure in cavity 38' and force of spring 27'.

When a predetermined speed is reached in the engine operating range, groove 26' of valve 25' is moved by the coupling to a position which allows fluid to be dumped out passage 24'. At this time, spring 27' is compressed so that a shoulder 51 of the coupling engages a slidable retainer 52. When engine speed and/or load further increases along with pressure in the inlet manifold and chamber 49', piston 42' is moved rightwardly. Rod 41' acts through piston 29' and against valve 25' to shift the coupling member 15' further to the right against the spring 18', thus dumping additional fluid from chamber 38' to passage 24'.

When the engine decelerates or load decreases, manifold pressure is reduced and the spring 18' moves the coupling 15' leftwardly until the passage 48 is again blocked from dumping oil. With a further decrease in engine speed and/or load, timing is adjusted by fluid pressure in the chamber 38' as described above. If engine speed and/or load are again increased, timing is adjusted by pressure in the chamber 49' in the same manner as described above.

What is claimed is:

1. A timing device for regulating an adjustable fuel injector timing element of an internal combustion engine to correlate the timing of fuel injection with engine speed and load conditions throughout a broad operating range, the engine having an inlet manifold for receiving air from a turbocharger driven by the engine, a coupling member being movably arranged in a housing to position the fuel injector timing element, comprising first means coupled with the fuel injector element and responsive to engine speed at least during relatively low speed operation of the engine to regulate the fuel injector timing element, said first means comprising passage means for communicating fluid under variable pressure from the engine to a chamber in communication with said movable coupling member, the variable pressure being generally proportional to engine speed, second means coupled with the fuel injector timing element and responsive to engine speed and load at least during relatively high speed operation of the engine, said second means being communicated with the manifold and responsive to variable pressure therein, and retarding means operatively coupled with said first means, said retarding means tending to resist regulation of the fuel injector timing element by said first means while said engine is operating at less than a low idle speed.

2. The device of claim 1 wherein said passage means is in communication with a pressurized lubricant passage in the engine.

3. The device of claim 1 wherein said retarding means comprises valve means for regulating pressure in said chamber and resilient means for operating said valve means.

4. The device of claim 1 wherein said resilient means comprises spring means arranged for interaction with said coupling member.

5. The device of claim 1 wherein said resilient means comprises flyweights effectively coupled with said valve means and responsive to engine speed.

* * * * *